Dec. 21, 1926.
J. W. RUGGABER
1,611,281
DRINK MIXER
Original Filed Oct. 7, 1921
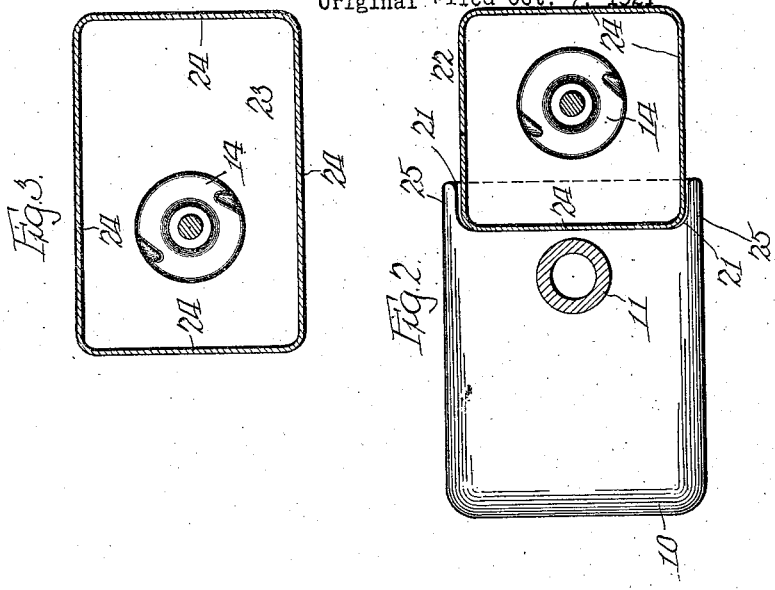
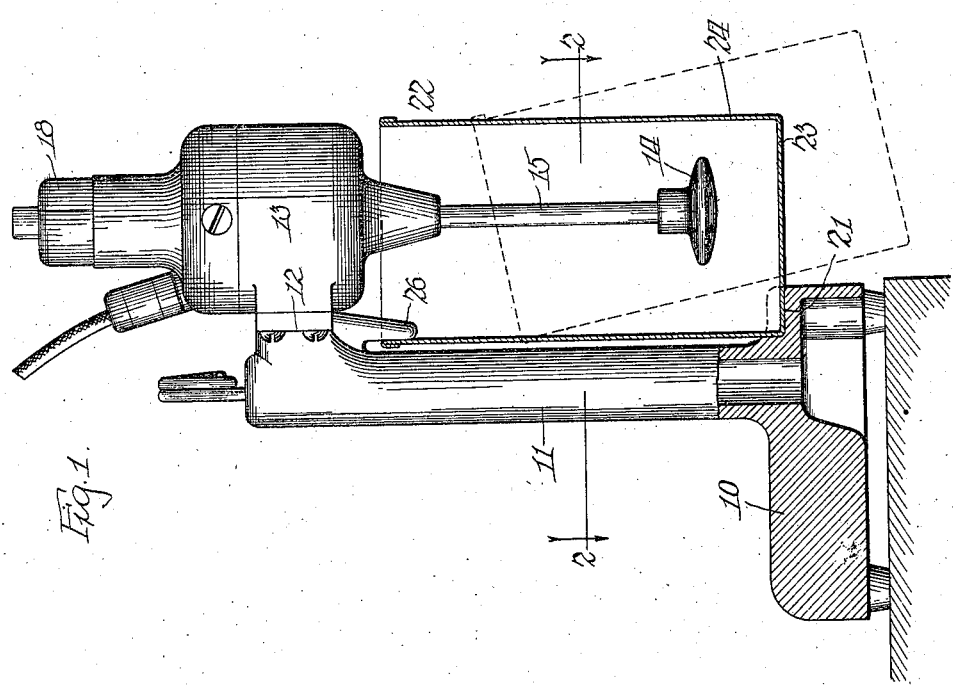
Inventor:
John W. Ruggaber
By Fred Gerlach
Atty.

Patented Dec. 21, 1926.

1,611,281

UNITED STATES PATENT OFFICE.

JOHN W. RUGGABER, OF RACINE, WISCONSIN, ASSIGNOR TO THE GILCHRIST COMPANY, OF NEWARK, NEW JERSEY, A CORPORATION OF NEW JERSEY.

DRINK MIXER.

Original application filed October 7, 1921, Serial No. 505,986. Divided and this application filed January 15, 1923. Serial No. 612,591.

The invention relates to motor-driven drink-mixers and its object is to provide a device of this type in which the agitating efficiency is increased to expedite a thorough blending of the constituents of a drink.

This application is a division of Serial No. 505,986 filed by me October 7, 1921 for improvements in drink mixers.

The invention consists in the several novel features hereinafter set forth and more particularly defined by claims at the conclusion hereof.

In the drawings: Fig. 1 is a side elevation of a mixer embodying the invention, the receptacle being shown in section. Fig. 2 is a horizontal section on line 2—2 of Fig. 1. Fig. 3 is a horizontal section through a modified form of container.

In drink-mixers, it is now common practice to use an electric motor with a depending shaft to agitate the contents of a container or vessel generally known as a "shaker". In practice, these motors attain a high speed, ranging from 5000 to 12,000 revolutions per minute. Heretofore, it has been customary to use a container of circular cross-section. In some instances, small protuberances have been formed in the wall of the receptacle to control or retard the drink-constituents. The high speed of the agitator, when directly driven by an electric motor, causes the material to rotate in the container to produce a vortex and to bank up the sides of the vessel. In these containers, their agitating efficiency is lessened by rapid rotation of the material with the agitator. A desideratum and practical necessity in drink mixers is that the receptacle should have an open top so that the service will not be retarded by the necessity of removing and replacing a cover on the container. That is, it is desirable to avoid any retarding of the service by minimizing the steps necessary to each complete cycle of operation in the mixing of a drink, and consequently, it is desirable to use the open-topped receptacle into which the constituents of a drink may be quickly placed and which can be readily and easily placed into its operative position around the agitator.

In practice, I have discovered, that, the high speed agitator in a container which is polygonal in cross-section or of polyhedral form will act to project the material into the angles or corners of the receptacle. This will measurably retard the circulation of the material. In a mixer of this character, the walls of the receptacle are sufficiently close to the agitator to come within the zone of rapid circulation of the material and, therefore, the liquid passing into the angles of the polyhedral container will be deflected from the circle of rotation and retarded. This action causes the deflected portions to yieldingly retard the rotation of those portions near the agitator. As a result, a thorough blending of the constituents will be effected in a comparatively short space of time without violently retarding the material in such a way as to cause it to spill over the rim and without a too violent agitation which will result in coagulating the cream constituents of a drink.

The invention is exemplified in a mixer comprising a base 10 adapted to rest on a table or counter and provided with an integral standard 11 to the upper end of which the casing of an electric-motor 13 is rigidly secured, as at 12. A shaft 15 is secured to and depends from the rotor of the electric motor and carries a suitable agitator 14 at its lower end. A switch 18 of any suitable construction may be used to control the operation of the motor, as well understood in the art. The mixer is of that type in which the motor is stationary and the agitator is mounted in a fixed relation to the motor, so that it is not necessary to shift the agitator or the motor in establishing cooperative relation between the container and the agitator. A recess 21 is formed adjacent the front of base 10 to receive the lower rear corner of a polyhedral container 22. A hook 26 on standard 11 is disposed to extend into the upper portion of the container and hold it on the base 10. Lugs 25 on the base hold the container against transverse movement. The receptacle 22, which has an open top, is adapted to be placed into operative position by manually lifting it around the agitator to bring its upper margin into hook 26 and manipulating the container backwardly to rest in the recess 21 and on the base. This structure is of that type in which manual manipulation of the receptacle into its operative position will cause it to be automatically held therein until it is removed without the necessity of additional steps, such as the raising and lowering of a receptacle-support, or the raising and lowering of the motor or the agitator for this purpose.

The container comprises a bottom 23 and vertical walls 24 joined to the base so as to form a mixing chamber which is approximately rectangular in cross-section. The size and cross-sectional shape of the container is such that the angles therein will form substantially vertical pockets which are sufficiently close to the axis of rotation to deflect and act on nearly all the material which is swirled by the agitator, and to yieldingly retard the material adjacent the axis of the agitator. This permits of a relatively larger agitator and will reduce the rotation of the material and the vortex produced by its rapid rotation and increase the mixing efficiency of the machine. The agitator 14 and the angular formation of the container are so co-related that they will have an agitating effect upon the material, but will not coagulate the material or spill it through the open top. In Fig. 3, there is shown a modification of the container, in which the sides are somewhat elongated to increase the capacity of the container, so that several drinks may, if desired, be mixed at one time.

The invention thus exemplifies a high-speed drink-mixer comprising a container which has substantially vertical angular pockets in its cross-sectional formation which expedite the mixing without coagulating the constituents and without causing the material to be splashed through an open top of the container.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a drink mixer, the combination of a motor provided with a depending agitator adapted to operate at high speed, means to support the motor, a container having an open top and adapted with its contents to be placed in operative relation to the agitator and angular in cross-section, the walls of the container being sufficiently close to the agitator so the corner portions will form pockets in which the material therein will retard the whirling of the material in the space adjacent the agitator caused by the high speed rotation of the agitator to increase its mixing effect and holding means adapted to retain the receptacle in its operative position around the agitator and permitting ready placement of the receptacle into and out of such position.

2. In a drink mixer, the combination of a motor provided with a depending agitator adapted to operate at high speed, means to support the motor, a container having an open top and adapted with its contents to be placed in operative relation to the agitator and polygonal in cross-section, the walls of the container being sufficiently close to the agitator so the corner portions will form pockets in which the material therein will retard the whirling of the material in the space adjacent the agitator caused by the high speed rotation of the agitator to increase its mixing effect and holding means adapted to retain the receptacle in its operative position around the agitator and permitting ready placement of the receptacle into and out of such position.

3. In a drink mixer, the combination of a motor provided with a depending agitator adapted to operate at high speed, means to support the motor, a polyhedral container having an open top and adapted with its contents to be placed in operative relation to the agitator and angular in cross-section, the walls of the container being co-related to the agitator so the corner portions will form pockets in which the material therein will retard the whirling of the material in the space adjacent the agitator caused by the high speed rotation of the agitator to increase its mixing effect and holding means adapted to retain the receptacle in its operative position around the agitator and permitting ready placement of the receptacle into and out of such position.

4. In a drink mixer, the combination of a motor provided with a depending agitator adapted to operate at high speed, means to support the motor, a container having an open top, adapted with its contents to be placed in operative relation to the agitator and substantially rectangular in cross-section, the wall of the container being sufficiently close to the agitator so the corner portions will form pockets in which the material therein will retard the whirling of the material in the space adjacent the agitator caused by the high speed rotation of the agitator to increase its mixing effect and holding means adapted to retain the receptacle in its operative position around the agitator and permitting ready placement of the receptacle into and out of such position.

Signed at Racine, Wisconsin, this 11th day of January, 1923.

JOHN W. RUGGABER.